United States Patent Office 3,017,879
Patented Jan. 23, 1962

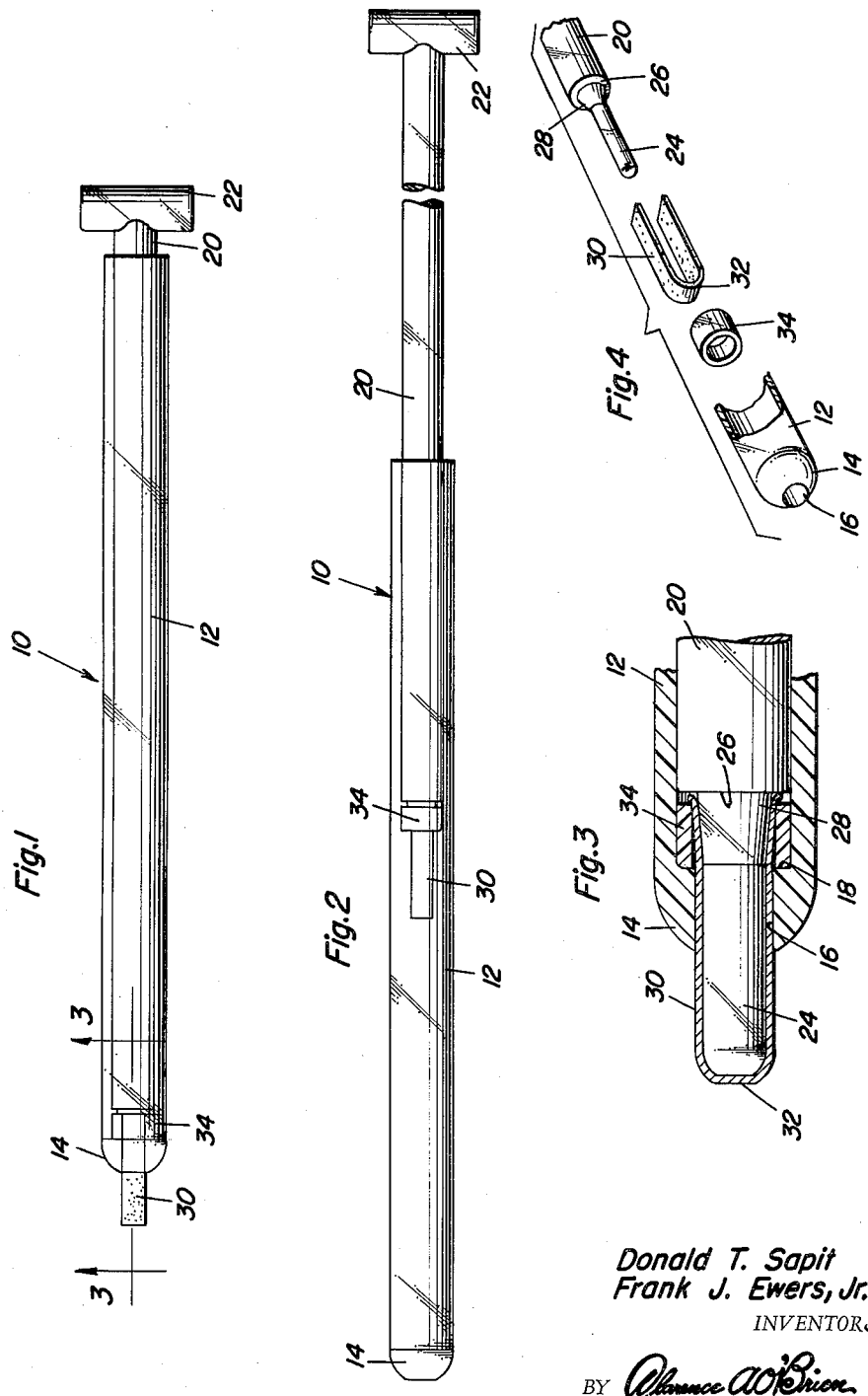

3,017,879
FERTILITY TESTER
Donald T. Sapit and Frank J. Ewers, Jr., Ottawa, Ill., assignors to Weston Laboratories, Inc., Ottawa, Ill., a corporation of Illinois
Filed Oct. 3, 1958, Ser. No. 765,078
3 Claims. (Cl. 128—2)

The present invention generally relates to a testing device and more particularly to a device for testing the secretions from the cervix during the menstrual cycle of a female for the purpose of determining the time of ovulation.

It is well known that the walls of the uterus and secretions from the cervix change in chemical make up during the various phases of the menstrual cycle. There is provided commercially a tape known as "Tes-Tape," a registered trademark of Eli Lilly Company, for the purpose of determining the presence of glucose. It has been found that glucose is present in the cervical secretions in varying amounts shortly before and at the time of ovulation. The presence of this glucose can be detected by changes in color of the "Tes-Tape" manufactured by Eli Lilly or other materials chemically treated to detect the persence of glucose. This tape which is commercially available requires the aid of a physician or other person with medical training for proper use thereof since it is absolutely necessary that the tape be inserted without contact with the vaginal walls so that the tape will not register or be contaminated by the secretion of the vaginal walls, thereby enabling the tape to test the secretions of the cervix for accurately determining the phase of the menstrual cycle due to the change in color of the tape caused by the secretion of the cervix. Therefore, it is the primary object of the present invention to provide a testing device in the form of a self-manipulated device having a holder thereon for the testing tape, the holder being mounted on a movable plunger that is normally concealed or retracted in protected position during insertion of the device and subsequently enabling the testing tape to be projected from its protected position after the device has been inserted into the vagina and has contacted the cervix thereby enabling the testing tape to be brought into contact with the secretions from the cervix without being contaminated by other body secretions.

A further object of the present invention is to provide a fertility tester in accordance with the preceding object in which the device is extremely simple in construction, easy to use, effective in operation and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevation of the tester of the present invention illustrating the plunger extended for revealing the test paper or tape;

FIGURE 2 is a side elevation of the device illustrating the plunger in retracted position;

FIGURE 3 is a detailed sectional view taken substantially upon a plane passing along section line 3—3 of FIGURE 1 illustrating the details of construction of the plunger and the manner of mounting the test paper thereon; and FIGURE 4 is an exploded group perspective view illustrating the construction of the plunger and relationship of the cylindrical barrel thereto.

Referring now specifically to the drawings, the numeral 10 generally designates the fertility tester of the present invention which includes an elongated cylindrical barrel member 12 having a rounded or radiused end 14 having a centrally disposed longitudinal opening 16 therein. The opening 16 is of less cross-sectional area than the internal diameter of the barrel 12 thus forming an annular shoulder 18 facing inwardly.

Slidably received in the barrel 12 is an elongated cylindrical plunger 20 having a transverse handle 22 at one end thereof whereby the plunger 20 may be reciprocated within the barrel 12.

The inner end of the plunger 20 is provided with a longitudinal extension 24 of less cross-sectional area than the plunger 20 with the juncture therebetween defining an annular shoulder 26 and a gradual tapered portion 28 extending between the shoulder 26 and the longitudinal projection 24. Disposed in overlying relationship and enclosing relationship to the projection 24 is a piece of test paper or tape of generally U-shaped configuration designated by the numeral 30 which has the bight portion 32 engaging the outer end of the projection 24 and having the leg portions thereof lying alongside of the projection 24. An annular or cylindrical securing ring or retaining ring 34 is provided which telescopes over the U-shaped paper 32 and is frictionally forced onto the tapered section 28 for frictionally binding the free ends of the legs of the U-shaped test paper 30 between the ring 34 and the tapered portion 28. The ring 34 will abut against the shoulder 26 for limiting the movement thereof and the ring 34 as well as the rest of the device may be constructed of plastic material which will provide sufficient rigidity for anchoring the test paper 30 to the projection 24 but yet permitting easy removal and replacement thereof. As clearly illustrated in FIGURE 3, the opening 16 is sufficient to permit passage of the projection 24, with the test paper 30 in position thereon, therethrough for effectively using the tester of the present invention.

In order to use the fertility tester, the tape 30 is placed over the projection or tip 24 of the plunger 20 and held in place by the tape retaining ring 34. The barrel 12 having the plunger 20 entered therein approximately one-half its length is then inserted into the vagina until it touches the mouth of the cervix or is otherwise entered as far as possible. The condition in which the device is inserted is illustrated in FIGURE 2. The plunger 20 is then pressed into the barrel 12 to its full depth so that the tape 30 on the projection 24 will pass out through the opening 16 and will contact the cervix and pick up or engage the secretion therefrom. The plunger 20 is then withdrawn to once again house the test tape 30 within the barrel 12 and the entire assembly is then withdrawn. The color of the testing tape 30 may then be read and compared with a color chart to determine the phase of the ovulation cycle.

The foregoing is considered as illustrative only of the present invention. Further, since numerous modifications and changes will readily occur to those skilled in the art, it is not desired to limit the invention to the exact construction and operation shown and described and accordingly, all suitable modifications and equivalents may be resorted to, falling within the scope of the invention as claimed.

What is claimed as new is as follows:
1. An apparatus especially adapted for insertion in a body cavity to effect a test of conditions existing some distance therewithin in freedom from contamination by fluids along the inner walls of said cavity leading to the site of the desired test which apparatus comprises an outer tube open at both ends, a plunger of length greater than said tube which is adapted for movement within said tube and for projection therefrom, the test end of said plunger being adapted for attachment of a test paper and the other end adapted to be grasped in the hand of the person moving the plunger within said tube, limit means for fixing the stroke of said plunger within said tube to permit the test end of said plunger to project only a predetermined distance therefrom, a testing material covering the test end of said plunger which is sensitive to the presence of a preselected body fluid, which testing material extends from the tip of said test end back along said plunger to a location such that when the plunger is moved to the forward limit of its stroke a significant portion of said testing material stays within said tube and is thereby free from contact with the interior of said body opening and removable means clamping said testing material on said plunger within said tube.

2. An apparatus especially adapted for insertion in the vagina which comprises an outer tube having a rounded, apertured end affording an inside shoulder, an inner plunger having a length greater than the said outer tube which is adapted for movement within said tube and having at least a portion at one end thereof of such narrowed diameter as to permit the same to protrude through the aperture in said tube when the plunger is moved to its extremity within said tube, a removable retainer ring fitting around the base of said narrowed portion and adapted to abut against the shoulder of the main portion of said plunger and the inside shoulder of the apertured end when the plunger is moved to the forward limit of its stroke, whereby said ring functions as a spacer between said shoulder and the apertured end of said outer tube and thereby reduces the distance said narrowed portion can extend from said tube, and a portion of testing material covering the end of said plunger and extending back along said narrowed portion a significant distance within said tube so as to assure freedom from contact of said extended portion and the interior of the vagina at which location the same is held in place by said retainer ring.

3. The apparatus of claim 2 wherein the testing material is paper comprising a mixture of glucose oxidase, peroxidase and an indicator capable of reacting with $H_2O_2$ to effect color change.

References Cited in the file of this patent
UNITED STATES PATENTS

| | | |
|---|---|---|
| 118,683 | Bruce | Sept. 5, 1871 |
| 977,825 | Murphy | Dec. 6, 1910 |
| 1,705,513 | Wappler | Mar. 19, 1929 |
| 2,090,354 | Massman | Aug. 17, 1937 |
| 2,664,879 | Hardy | Jan. 5, 1954 |
| 2,847,990 | Ayre | Aug. 19, 1958 |